(12) United States Patent
Kristensson et al.

(10) Patent No.: US 7,017,102 B1
(45) Date of Patent: Mar. 21, 2006

(54) FORWARD ERROR CORRECTION (FEC) FOR PACKETIZED DATA NETWORKS

(75) Inventors: Jesper Kristensson, San Francisco, CA (US); Terry Hardie, Newark, CA (US); Tony Hardie, Newark, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 323 days.

(21) Appl. No.: 10/161,196

(22) Filed: May 31, 2002

Related U.S. Application Data

(60) Provisional application No. 60/345,582, filed on Dec. 27, 2001.

(51) Int. Cl.
*H03M 13/03* (2006.01)

(52) U.S. Cl. .................. 714/786; 714/752; 370/216
(58) Field of Classification Search ............... 370/216; 714/751, 776, 752, 774
See application file for complete search history.

(56) References Cited

U.S. PATENT DOCUMENTS

| | | | | |
|---|---|---|---|---|
| 5,600,663 A | * | 2/1997 | Ayanoglu et al. | 714/774 |
| 5,870,412 A | * | 2/1999 | Schuster et al. | 714/752 |
| 6,141,788 A | * | 10/2000 | Rosenberg et al. | 714/774 |
| 6,157,642 A | * | 12/2000 | Sturza et al. | 370/389 |
| 6,477,669 B1 | * | 11/2002 | Agarwal et al. | 714/708 |
| 6,490,705 B1 | * | 12/2002 | Boyce | 714/776 |
| 6,675,340 B1 | * | 1/2004 | Hardie et al. | 714/751 |
| 6,771,674 B1 | * | 8/2004 | Schuster et al. | 370/537 |
| 6,839,330 B1 | * | 1/2005 | Chitre et al. | 370/310.1 |

* cited by examiner

*Primary Examiner*—Albert Decady
*Assistant Examiner*—John P. Trimmings
(74) *Attorney, Agent, or Firm*—Townsend and Townsend and Crew LLP

(57) ABSTRACT

A method is provided for forward error correction for packets of information transmitted in a network. In one example, the method includes adding redundant information to the packets to be transmitted; transmitting the packets, wherein many of the packets become arrived packets, and wherein one or more of the packets becomes one or more lost packets; and restoring the one or more lost packets using redundant information of the arrived packets.

19 Claims, 17 Drawing Sheets

|   8   |   16   |   24   |   32   |
|-------|--------|--------|--------|
| Size #1 | Size #2 | Size #3 | Size #4 |
| Size #5 | Group ID | Group Seq # | Variable length... |

FIG. 13

| 0 | 8 | 16 | 24 | 31 |
|---|---|---|---|---|
| Frame Type | C/N | Stream Identifier || |
| Sequence Number || Data Length || |
| Size #1 | Size #2 | Size #3 | Size #4 ||
| Size #5 | Group ID | Group Seq # | Data... ||

FIG. 14

Frame 1, Call Processing
*7 bytes of header and 1 byte of data*

H = Header data byte

| HHHHH  HHA |
|---|

Frame 2, SX9600P
*7 bytes of header and 18 bytes of data*

| HHHHH  HHBBB  BBBBB  BBBBB  BBBBB |
|---|

Frame 3, SX7300P
*7 bytes of header and 14 bytes of data*

| HHHHH  HHCCC  CCCCC  CCCCC  C |
|---|

Frame 4, G729A
*7 bytes of header and 10 bytes of data*

| HHHHH  HHDDD  DDDDD  DD |
|---|

Frame 5, G723_1
*7 bytes of header and 24 bytes of data*

| HHHHH  HHEEE  EEEEE  EEEEE  EEEEE  EEEEE  E |
|---|

FIG. 16

Data used to generate ECC, *67 bytes*

| HHHHH HHAHH HHHHH BBBBB BBBBB BBBBB BBBBB |
|---|
| HHHHH HHCCC CCCCC CCCCC CHHHH HHHDD DDDDD |
| DDDHH HHHHH EEEEE EEEEE EEEEE EEEEE EEEE |

ECC data, *26 bytes*                    Y = ECC data byte

| YYYYY YYYYY YYYYY YYYYY YYYYY Y |
|---|

FIG. 17

Extra Header, *7 bytes*

| XXXXX XX |   X = Extra header byte
|---|

FIG. 18

Frame 1

| xxxxx   xxx |

X = Lost Byte

Frame 2

| HHHHH   HHBBB   BxBBB   BxBBB   BxBBB |

Frame 3

| HHHHH   HHCxC   CCCxC   CCCxC |

Frame 4

| HHHHH   HHDDx   DDDDx   DD |

Frame 5

| HHHHH   HHEEx   EEEEx   EEEEx   EEEEx   EEEEx   E |

ECC Data

| YYYxY   YYYxY   YYYxY   YYYxY   YYYxY   Y |

FIG. 23

FORWARD ERROR CORRECTION (FEC) FOR PACKETIZED DATA NETWORKS

"This application claims the benefit of U.S. Provisional Patent Application No. 60/345,582, entitled "Forward Error Correction (EEC) For Packetized Data Networks." filed Dec. 27, 2001, which is herein incorporated by reference. This application is related to now abandoned U.S. patent application Ser. No. 09/693,782, entitled "System and Method for Frame Packing," filed Oct. 19, 2000, which is herein incorporated by reference. This application is also related to U.S. patent application Ser. No. 09/693,788, now U.S. Pat. No. 6,675,340, entitled "Forward Error Correction (FEC) for Packetized Data Networks," filed Oct. 19, 2000, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to transmission of data in an internet protocol (IP) network and, more particularly, to techniques for loss and recovery of data transmitted in a voice over internet protocol (VoIP) network.

2. Discussion of Background

Voice over Internet Protocol (VoIP) refers to the transportation of voice traffic over IP networks rather than the Public Switched Telephone Network (PSTN). It is a relatively new technology whereby audio is sent, for example between two or more computer users in real time via an IP network, so the users can converse. Analog voice is sampled, digitized and compressed and then put in packets that are sent over an IP network.

One way of using this technology is to connect a VoIP gateway to the PSTN network. A call from a conventional phone is made to the VoIP gateway and routed over the IP network to its destination VoIP gateway where it is again passed on to PSTN. The benefit from this is that the expensive long distance part of the call can be carried out at a lower cost.

In VoIP, voice data is compressed into frames. Each frame represents the voice data for a small unit of time, typically 30 milliseconds. These frames are then formed into packets and sent over IP. It is the responsibility of the underlying protocols to insure the packets received at the other end are correct and received at all.

The normal way of dealing with lost or incorrect packets over IP is to retransmit packets. This technique is used in TCP (Transport Control Protocol) running over IP. The Internet Protocol and the TCP was not designed for real time data transmission such as VoIP, where each packet is time critical. A retransmitted voice packet will arrive too late too be useful.

One method to deal with lost packets in VoIP is to introduce a buffer where a certain amount of packets are stored in order to make sure that packets can be received in a correct order even with some packets being retransmitted. This method can be used in a one-way application such as streaming audio where a short delay is acceptable. In a two-way communication such as VoIP this type of solution would introduce an unacceptable latency.

Another method is to transmit all frames twice or even three times to make sure that at least one of them arrives at the receiving end. This solution has the drawback of using a lot of extra bandwidth.

SUMMARY OF THE INVENTION

It has been recognized that what is needed is a better way to deal with the loss of voice packets over an IP network. Broadly speaking, the present invention meets this need by providing a method for forward error correction in an IP network. More specifically, the present invention meets this need by providing a system and method for forward error correction in a Voice over IP (VoIP) network.

In one embodiment, a method is provided for forward error correction for packets of information transmitted in a network. The method comprises adding redundant information to the packets to be transmitted; transmitting the packets, wherein many of the packets become arrived packets, and wherein one or more of the packets becomes one or more lost packets; and restoring the one or more lost packets using redundant information of the arrived packets.

In another embodiment, a method is provided for transmitting packets of data in a network, wherein each packet includes frames of data. The method comprises adding error correction code (ECC) to the packets of data to be transmitted; interleaving the error correction code with data in the frames of data to form an interleaved group of frames, such that data from each frame is spread out over all frames in the interleaved group of frames; and transmitting the packets.

In still another embodiment, a method is provided for receiving packets of data from transmitted packets of data in a network, wherein each packet includes frames of data, the method comprises receiving packets, wherein the packets include interleaved groups of frames of data, and wherein the interleaved groups include error correction (ECC) interleaved with data in the frames of data; deinterleaving the groups of frames to form deinterleaved frames; extracting the error correction code (ECC) from the deinterleaved frames; and restoring one or more lost packets using the error correction code.

Advantageously, the present invention provides a way to better accommodate the loss of voice packets over an IP network.

The invention encompasses other embodiments of a method, a system, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 13 shows the format of the extra header for reconstructing and interleaving frames, in accordance with an embodiment of the present invention.

FIG. 14 is a voice transport protocol extension (VTPX) frame header format, in accordance with an embodiment of the present invention.

FIG. 16 shows the five initial frames, in accordance with an embodiment of the present invention.

FIG. 17 shows generated ECC data, in accordance with an embodiment of the present invention.

FIG. 18 shows extra header data, in accordance with an embodiment of the present invention.

FIG. 23 describes the frames when the deinterleaving is done, in accordance with an embodiment of the present invention.

DESCRIPTION OF THE PREFERRED EMBODIMENTS

A method is disclosed for forward error correction for packets of information transmitted in a network. Numerous specific details are set forth in order to provide a thorough understanding of the present invention. It will be understood, however, to one skilled in the art, that the present invention may be practiced without some or all of these specific details.

Technical Background

To better understand the material covered in this invention the reader will need technical background in several fields. Data Communication including the protocols and methods used to transport voice over the Internet Protocol will be explained. The basics of Information Theory will be laid out briefly and Reed-Solomon codes in particular will be explained.

VoIP And The TCP/IP Protocol Stack

The TCP/IP stack of communication protocols is the most widespread data communication standards. The protocols, which include the Internet Protocol (IP), the Transmission Control Protocol (TCP), the User Datagram Protocol (UDP) and other protocols, are deployed in layers, with each layer responsible for a different step of the communication.

Figure 1:
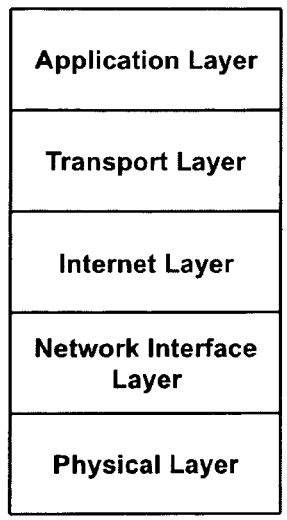
FIG. 1 shows the conceptual layers that deploy these protocols, in accordance with the present invention.

FIG. 1 shows the conceptual layers that deploy these protocols, in accordance with the present invention. The application layer handles the details of the particular application. Some common TCP/IP applications include Telnet for remote login, File Transfer Protocol (FTP), Simple Mail Transfer Protocol (SMTP) for email transport. The application program passes data in the required form to the transport layer for delivery.

VoIP standardized protocols in this layer is the Real Time Protocol (RTP) for voice transport. Signaling, which handles the set up and tear down of calls, are also a part of the application layer. The two main standards, which have emerged for signaling and control in VoIP are the H.323 and Session Initiation Protocol (SIP).

SIP is a protocol that is part of the overall Internet Engineering Task Force (IETF) multimedia architecture. H.323 is an umbrella recommendation from the International Telecommunications Union (ITU) that sets standards for multimedia communications over Local Area Networks (LANs).

The Transport Layer provides a flow of data between two application programs in the layer above. The TCP/IP protocol suite has two transport protocols, Transmission Control Protocol (TCP) and the User Datagram Protocol (UDP). TCP uses retransmission for lost packets, thus providing a reliable connection-oriented flow of data between two hosts.

UDP, on the other hand, provides a much simpler service to the application layer. It offers an unreliable connectionless data transmission service by sending packets of data called datagrams from one host to the other. UDP does not offer guaranteed delivery of the datagrams to the other end. Any desired reliability has to be added by the application layer.

The signaling protocols in VoIP traditionally use TCP, the reason being its reliability and also since the delay introduced by a retransmission is acceptable here. For voice transport, UDP is used, and reliability is then added in the application layer. This is at least the way things are supposed to work. In reality many implementations of the signaling protocols use UDP as a transport protocol and add retransmission capability in the signaling protocol.

IP provides the network layer in the TCP/IP protocol suite. This handles the communication from one machine to another. It encapsulates the packets handed by the transport layer into an IP datagram, fills in the header and lets a routing algorithm determine how to send the datagram.

This normally includes the device driver in the operating system and the corresponding network interface card in the computer. These handle all the hardware details of physically interfacing with the cable and the underlying media. IP protocols are supported over a variety of underlying media, such as ATM, frame relay, dedicated lines, ISDN, Ethernet, Token Ring, etc.

The Physical layer covers the physical interface between a data transmission device and a transmission medium or network.

Communication and Information Theory

Figure 2:
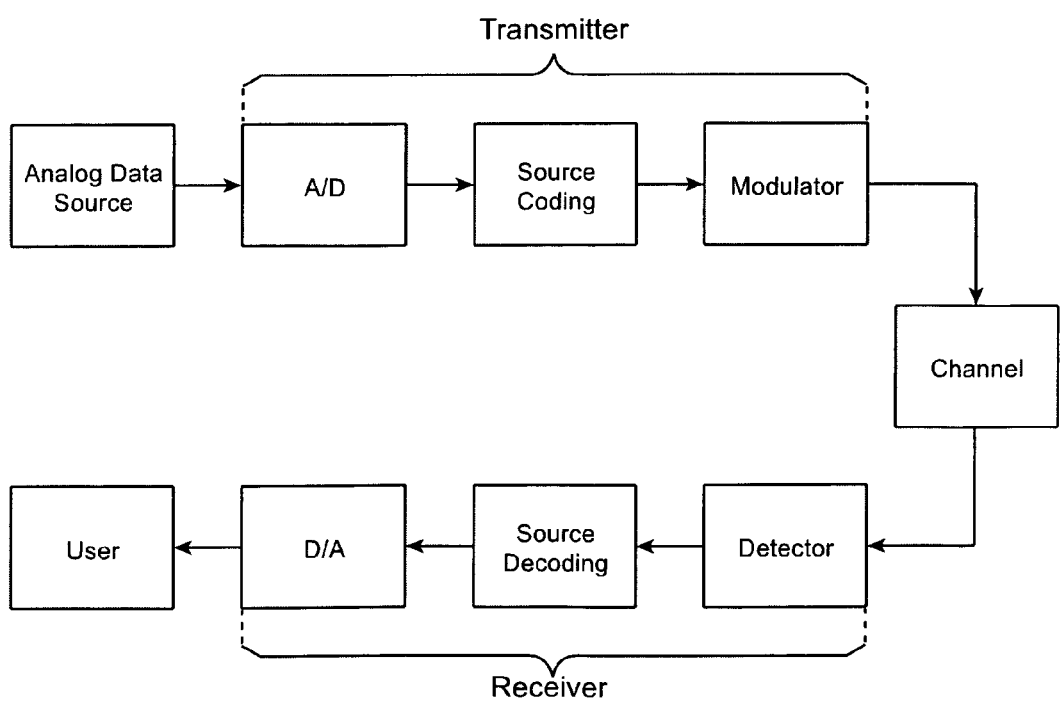
FIG. 2 illustrates the model of most digital communication systems, in accordance with an embodiment of the present invention.

FIG. 2 illustrates the model of most digital communication systems, in accordance with an embodiment of the present invention. Relating to VoIP the flow through this model can be described by voice being sampled and digitized in the A/D box in the figure. The Source Coding block performs compression and the underlying network implements the Modulator.

Imperfection in the physical channel, such as noise, introduces errors in the physical layers that are propagated through out the communication layers. This issue can be addressed by increasing the power used in the transmitter. Such an approach is hence done in the physical layer of the OSI network model and therefore not a possible solution in our case. A better approach is to modify the data sent by the transmitter in order to make the data resistant to the discrepancies introduced by the physical channel. This approach is called Error Control Codes.

Figure 3:
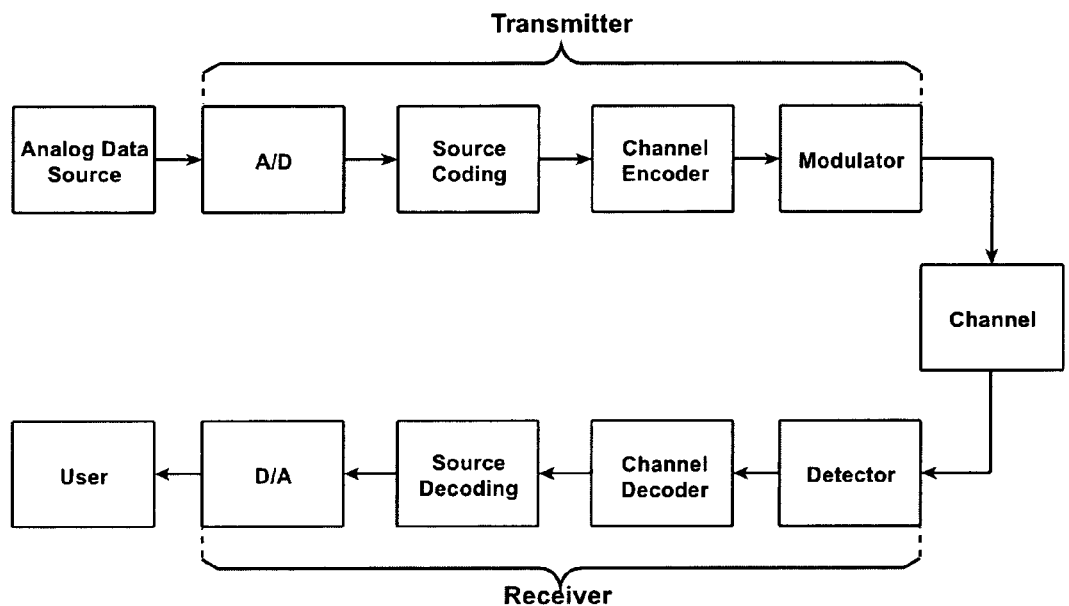
FIG. 3 shows the new model derived from introducing Error control codes into the present model of a communication system, in accordance with an embodiment of the present invention.

FIG. 3 shows the new model derived from introducing Error control codes into the present model of a communication system, in accordance with an embodiment of the present invention. The Channel encoder box in the scheme adds controlled redundancy in the form of Error Control Codes.

Error Correction Codes is also known as Forward Error Correction (FEC) since any errors occurring under transmission can be corrected at the receiver side without the need for retransmission. FEC can be viewed as an advanced form of checksums. By applying a set of mathematical equations to the information data, redundant data or parity bits is generated. The redundant data is called Error Correction Code (ECC data) and is sent together with the information data. At the receiving end the ECC is used to check the correctness of the data and to correct the errors in the data when possible.

The amount of inserted redundancy is usually expressed in terms of the code rate R (Eq. 1). The code rate is the ratio of, k the number of data symbols transmitted per code word and n, the total number of symbols transmitted per codeword $$R = k/n \quad \text{(Eq. 1)}$$

Depending on which type of code, the code rate also gives a good indication of complexity and error correction capability.

Reed-Solomon Codes

The present solution for Forward Error Correction in a VoIP gateway uses Reed-Solomon codes. See U.S. patent application Ser. No. 09/693,788, now U.S. Pat. No. 6,675,340, entitled "Forward Error Correction (FEC) For Packetized Data Networks," filed Oct. 19, 2000. Reed-Solomon Codes are used in a wide range of applications in digital communication and storage. These applications include Compact Disk, DVD, Cellular phones, Satellite Communications and High-speed modems.

Reed-Solomon Codes are a subset of BCH codes and are categorized as linear block codes. A Reed-Solomon code is specified as RS (n,k) with s-bit symbols. This means that a block of k data symbols of s bits each adds parity symbols to form an n-symbol codeword. The error correction and error detection capabilities of this Reed-Solomon code is specified by 2t=n−k. The Reed-Solomon code can correct up to t symbols and detect 2t errors in each code word.

Figure 4:
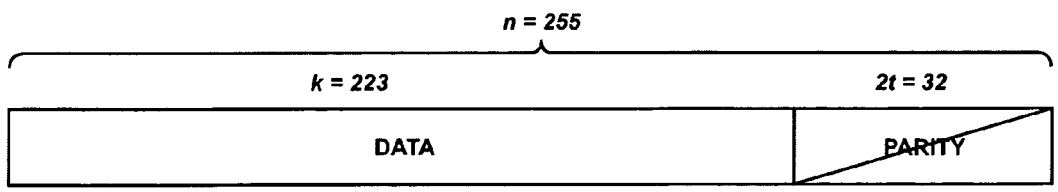
FIG. 4 shows an example of a common Reed-Solomon code as RS(255,223) with 8-bit symbols, in accordance with an embodiment of the present invention.

FIG. 4 shows an example of a common Reed-Solomon code is RS(255,223) with 8-bit symbols, in accordance with an embodiment of the present invention. In this codeword the decoder can detect and correct any 16 corrupted symbols. This means errors in up to 16 bytes anywhere in the code can be corrected. Alternatively this code can correct 32 erased symbols if the locations of the erasures are known. Note that the decoder can correct any of the symbols in the codeword regardless if a data symbol or a parity symbol is lost.

To get a flexible length of a Reed-Solomon codeword shortened Reed-Solomon codes are often used. The codes are shortened by conceptually making a number of data symbols zero at the encoder, not transmitting them and, and then reinserting the zero bytes at the decoder. The code word described above can for example be shortened to (200,168) by taking a block of 168 bytes of data and add 55 zero bytes creating a (255,223) codeword. Then only transmitting the 168 data bytes and the 32 parity bytes.

The complexity of decoding and encoding a Reed-Solomon code is as expected related to the number of parity symbols in each codeword. The relationship between data symbols and parity symbols are described by the code rate R.

Reed-Solomon codes are particularly well suited to correct burst errors where a series of bits in a symbol are received in error. They are therefore also well suited to correct for erasures whereas symbols are not received at all and the location of the erasure within the codeword is known. This last characteristic is a key reason why it is chosen in a packetized network where the receiver often can supply information of when a symbol is erased since the loss of a packet is known from a missing sequence number in a stream of packets.

Reed-Solomon codes are based on an area of mathematics known as Galois fields or finite fields. Ordinary arithmetic takes place in an infinite field, so named because it has an infinite number of elements. A finite field has the property that all arithmetic operations on a field always have a result within the field. Both the encoder and the decoder need to carry out these arithmetic operations.

A Galois Field $GF(q^m)$ is specified by its order $q^m$. The Galois Field used in the RS(255,223) codeword is GF(256) and all the arithmetic operations used in encoder and decoder is specified by that particular Galois Field. A Reed-Solomon code uses a $q^m$-ary Galois field $GF(q^m)$ and the length of the codeword is $q^m-1$. In the previously described codeword q=2 and m=8. The symbol length is specified by m. In GF(256) the symbol length equals 8 bits or a byte, which makes it particularly useful in data communication.

A Reed-Solomon codeword is generated using a generator polynomial. All valid codewords are divisible by the generator polynomial g(x). The form of the generator polynomial is given by (Eq. 2):

$$g(x)=(x-a^i)(x-a^{i+1})\ldots(x-a^{i+2t}) \quad \text{(Eq. 2)}$$

An example of a Generator polynomial (Eq. 3) for RS(255,249)

$$g(x)=(x-a^0)(x-a^1)(x-a^2)(x-a^3)(x-a^4)(x-a^5)$$

$$g(x)=x^6+g_5x^5+g_4x^4+g_3x^3+g_2x^2+g_1x^1+g_0 \quad \text{(Eq. 3)}$$

And the codeword is constructed using (Eq. 4).

$$c(x)=g(x)i(x) \quad \text{(Eq. 4)}$$

Where $i(x)$ is the information block and $c(x)$ is a valid codeword. All valid codewords are referred to as a primitive element of the field, since it is evenly divisible by the generator polynomial.

The 2t parity symbols are given by (Eq. 5)

$$p(x)=i(x)x^{n-k} \bmod g(x) \quad \text{(Eq. 5)}$$

The operations done at the encoder are significantly less complex than those done at the receiving end in the decoder.

Figure 5:
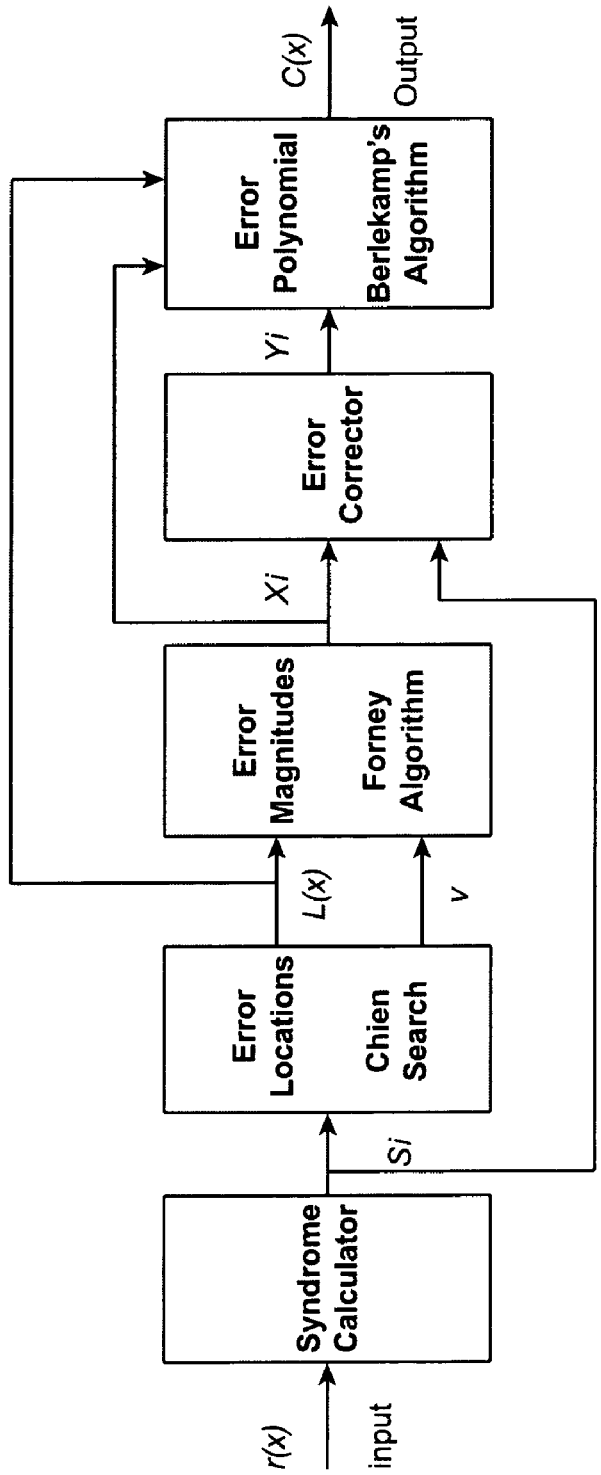
FIG. 5 shows a general decoder architecture of a received Reed-Solomon codeword, in accordance with an embodiment of the present invention.

FIG. 5 shows a general decoder architecture of a received Reed-Solomon codeword, in accordance with an embodiment of the present invention. However, the embodiment is not so limited to this particular architecture. The decoder can be divided into several steps where the first step is the Syndrome Calculation. This is a similar calculation to the parity calculation and 2t syndrome components are calculated.

The syndromes are then used in the next step to find the error location polynomial. This step involves solving simultaneous equations with t unknowns. The most common algorithms used to find the error location polynomial is Berlekamp-Massey or Euclid's algorithm. The roots of this polynomial give the location of the errors in the codewords. Chien's search algorithm is used to find the roots. The syndromes and the error locations are then used to calculate the magnitude of the errors. Again this involves solving simultaneous equations with t unknowns. A widely used algorithm is the Forney algorithm.

To summarize the decoder one can conclude that it involves several calculations with high complexity. A lower complexity can be achieved if the locations of the errors are known. This advantage can be exploited in a packetized network where all packets have sequence numbers. The decoder would then be an erasure decoder that only corrects for the erased bytes.

VoIP Gateway

Figure 6:
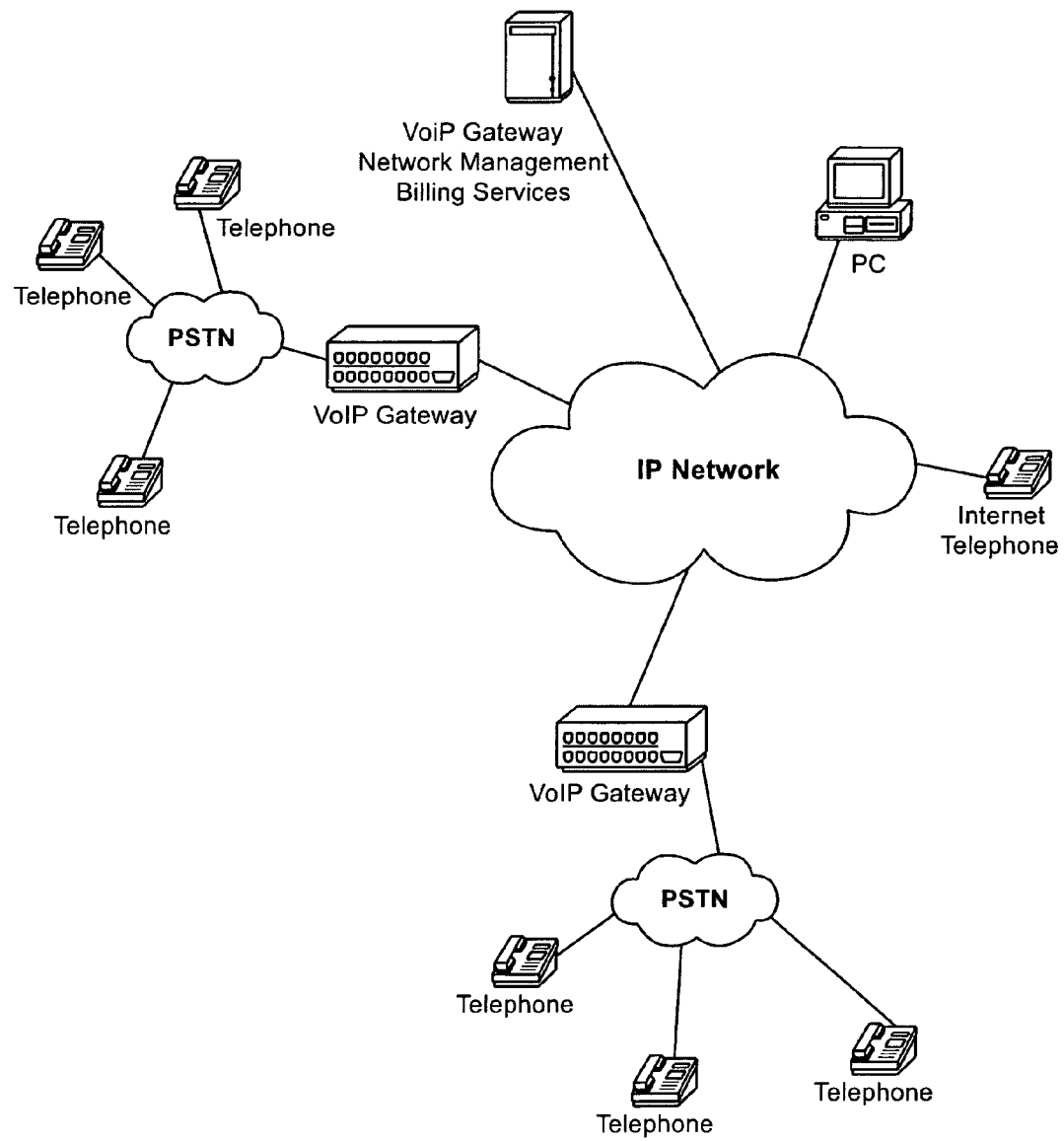
FIG. 6 shows a high-level view of a VoIP gateway as it operates with an IP network and PSTN, in accordance with an embodiment of the present invention.

FIG. 6 shows a high-level view of a VoIP gateway as it operates with an IP network and PSTN, in accordance with an embodiment of the present invention. A VoIP gateway is a gateway between the PSTN and IP network. A call is placed from a regular handset on the PSTN to a VoIP gateway and then routed to another VoIP gateway before it reaches its final destination on the PSTN network. Calls can also be placed from a PC with the appropriate software to a telephone handset on the PSTN.

The VoIP gateway capabilities include the transport and compression of voice and signaling data. Since the emphasis in here is on voice or data transport with real-time requirements. We will take a closer look on the way VoIP gateway transports voice or data packets between the nodes in a network.

An incoming call is sampled and the voice can be compressed using an array of different compression schemes chosen on a per call basis. The compressed data is then packetized and sent over the network using any type of protocol, including proprietary protocols, that will allow such transport. One example of such a protocol is the Voice Transport Protocol (VTP), a proprietary protocol developed by Network Equipment Technologies. See now abandoned U.S. patent application Ser. No. 09/693,782, entitled "System and Method For Frame Packing," filed Oct. 19, 2000.

Voice Over IP Protocols

A protocol used in a VoIP gateway to handle the transport of voice frames between their own gateway is a lightweight protocol called Voice Transport Protocol (VTP). As mentioned above, VTP is a proprietary protocol developed by Network Equipment Technologies. The embodiment is not limited to the use of VTP. Another protocol that can compress data is then packetized and sent over the network can be used. Whichever protocol used here, the protocol is placed right on the IP layer avoiding both RTP and UDP, which is the common approach in VoIP. However, a protocol using this forward error correction scheme would not be required to be placed right on the IP layer. The protocol may be placed in RTP, which in turn is placed in UDP. For additional detail, see now abandoned U.S. patent application Ser. No. 09/693,782, entitled "System and Method For Frame Packing," filed Oct. 19, 2000.

The most significant difference in VTP compared to RTP is its frame-packing capabilities. Multiple voice samples from different phone calls directed for the same VoIP gateway are grouped together in one VTP packet and encapsulated into the same IP datagram.

Each voice sample consists of a small amount of data, typically 10–240 bytes. This size depends on compression scheme and the time duration covered by the voice sample (typically 10–30 ms). Each voice sample is given a 7-byte header with information necessary for directing and routing the call as well as information for the receiving node to on how to decode data and place it in the correct call.

Figure 7:
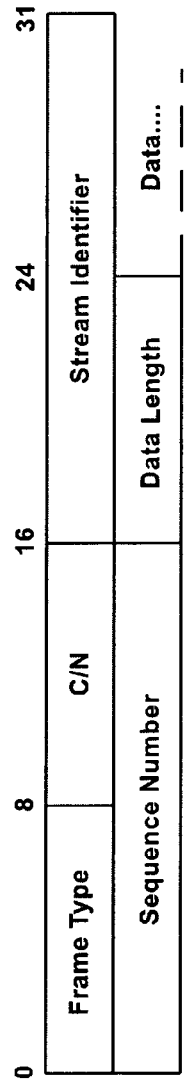
FIG. 7 shows a VTP frame including a voice sample and its header, in accordance with an embodiment of the present invention.

FIG. 7 shows a VTP frame including a voice sample and its header, in accordance with an embodiment of the present invention. The field Frame Type is given a value indicating if the frame contains Voice data, Silence, Tone (DTMF) or Fax Data. When the frame contains multiple VTP frames this will be indicated in the Frame Type header instead of indicating the contents of the frame. The C/N (Codec/Number of Frames) field's interpretation is dependent on the value in the frame type field. When the frame type field indicates a multiple frame packet, this field is interpreted as the number of frames in the packet. Otherwise this field contains info on the codec used to compress this stream. The Stream Identifier field contains an opaque unsigned 16-bit identifier used to differentiate one stream from another. The Sequence number field contains an unsigned 16-bit packet sequence number. The length of the frame data excluding the header is specified in the Data Length field. All VTP frames with the same destination node are then grouped together into a VTP packet and given a common header.

Figure 8:
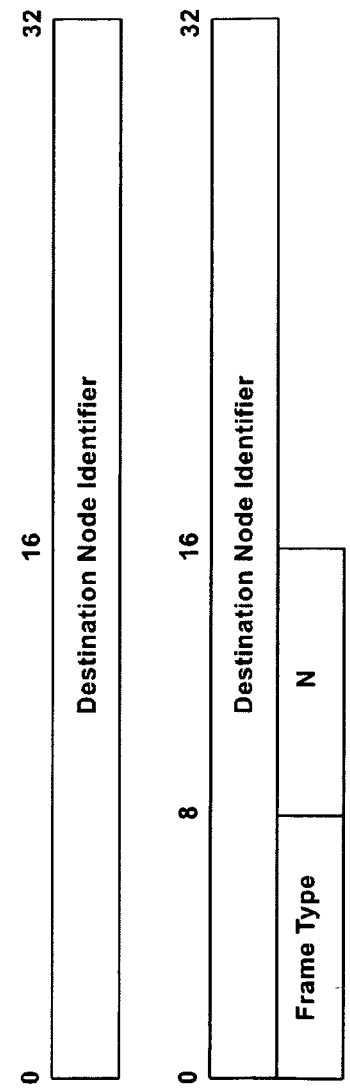
FIG. 8 shows a VTP packet header for single frame (upper) and multi frame (lower), in accordance with an embodiment of the present invention.

FIG. 8 shows a VTP packet header for single frame (upper) and multi frame (lower), in accordance with an embodiment of the present invention. Note that a VTP packet then contains data from several different calls that all have the same destination node. The VTP packet is then encapsulated into an IP datagram and sent out on the underlying network interface layer such as Ethernet.

The gains from this approach are that its bandwidth efficient since the overhead ratio is lower than when each voice frame is place in a separate IP datagram. The ratio of data and overhead in each datagram is better. Also the routers in the network get a lower amount of IP datagram to route over the network. Many small datagram are more likely to cause congested routers then fewer large datagram.

Designing a Solution

As a recap, the problem to be solved with the present invention is the issue of lost packets over the network. The packets being lost over the network are the IP datagrams.

Thus, several voice frames will be lost whenever a datagram is lost. The frame packing algorithm described here will be modified, as discussed below, in order to better accommodate FEC.

Existing Forward Error Correction Solution in VoIP Gateway

Earlier work on Forward Error Correction in VoIP gateway includes U.S. patent application Ser. No. 09/693,788, now U.S. Pat. No. 6,675,340, entitled "Forward Error Correction (FEC) For Packetized Data Networks," filed Oct. 19, 2000. The methods in this solution have been tested in the product. The tests have been successful in the sense that lost IP datagrams are corrected on the VTP level. However, the complexity coming from the high code rate restricts the VoIP gateway from running more than a few calls when using FEC.

Each Voice Frame generated by the Voice Hardware is taken separately and Error Correction Code (ECC) is calculated using the Reed-Solomon algorithm. In order to protect for the loss of the full voice frame, which is the case when losing a packet over the Internet, the length of the ECC is the same as the length of the voice frame. This gives us a code rate $R=\frac{1}{2}$, an unusually low code rate when using Reed-Solomon codes.

When ECC is generated, there will be one data frame and one corresponding ECC frame. The ECC frame is split up and placed in different frames in a transmitting queue, while the voice frame is left untouched in another transmitting queue. The described flowchart is on a per call basis; each call has its own queues.

Figure 9A:
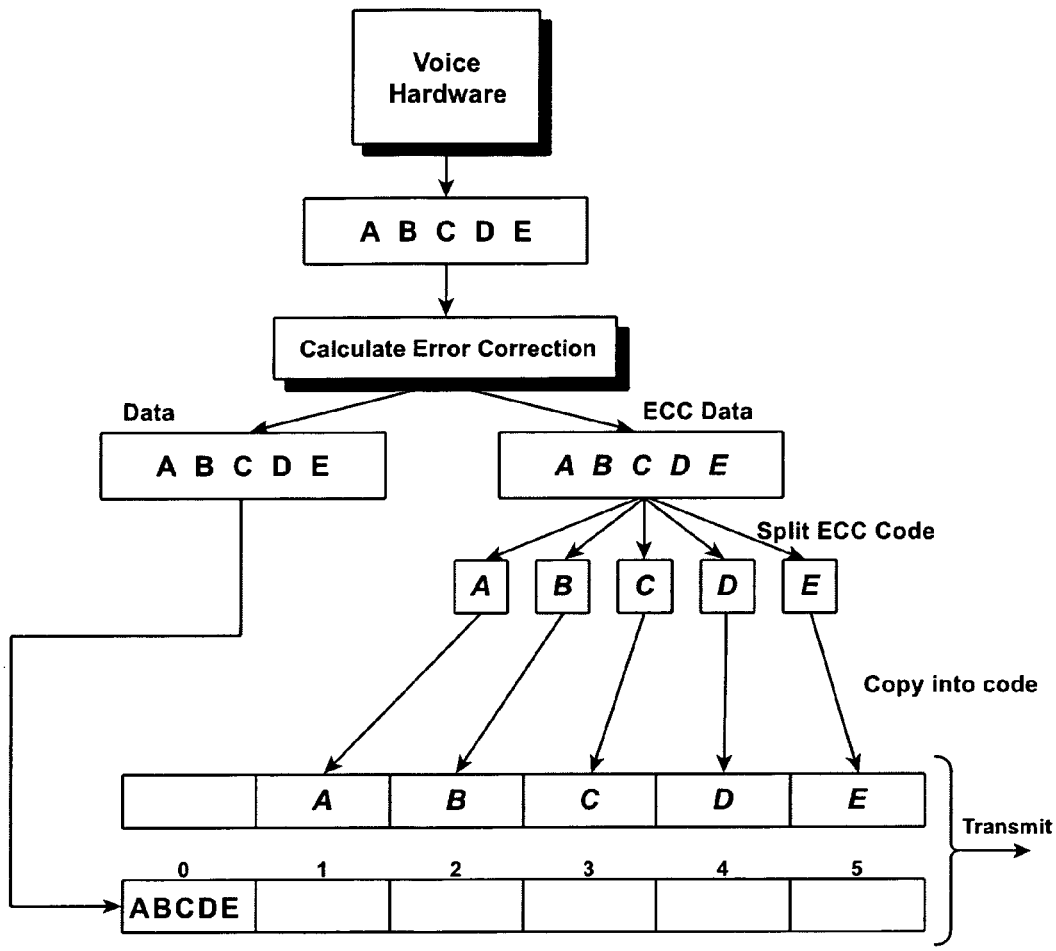
FIG. 9A shows an existing ECC transmitter scheme, in accordance with a prior method of forward error correction.

FIG. 9A shows a ECC transmitter scheme, in accordance with a prior method of forward error correction.

Figure 9B:
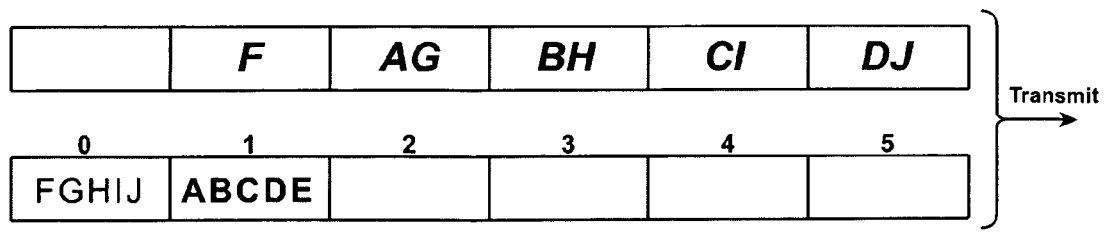
FIG. 9B shows a first step for transmitter queues, in accordance with a prior method of forward error correction.

FIG. 9B shows a first step for transmitter queues, in accordance with a prior method of forward error correction. The rightmost frames of both two queues are sent onto VTP frame packing and transmitted over the network to the receiving end. A flag is set in the Frame Type field of the VTP frame header to indicate when the VTP frame contains ECC data.

In the example above, the length of the queues are five voice frames. Since each voice frame represents 30 ms of data, the transmission latency will add up to 150 ms. The advantage of spreading out the ECC over several frames is that the error correction at the receiver can correct not only for a lost voice frame but also for the loss of one of the ECC frames.

At the receiver, incoming packets will be sorted into either an ECC queue or a queue for the voice frames, depending on what the VTP frame header indicates. Voice frames will be copied down immediately to the voice hardware. The ECC frames will be kept in the ECC queue until the corresponding voice frames have arrived. In the event of voice frame loss, which a missing sequence number will indicate, the corresponding ECC frame can be assembled from the ECC queue and the voice frame can be restored using the Reed-Solomon algorithm.

The number of VTP frames generated will be doubled when using FEC, and therefore double the amount of bandwidth will be used. It is important to note that this will use the same amount of frames and the same amount of bandwidth as sending every frame twice.

The advantage over sending frames twice is that this method can correct for burst of errors. The price of this advantage comes with the high complexity of the Reed-Solomon code at the unusually low code rate that is used.

The complexity of the Reed-Solomon codes increases exponentially with the number of ECC symbols.

The latency introduced in this example is 150 ms. This latency is acceptable. However, because latency is introduced in other parts of the system (i.e. voice hardware and network transport), latency should be kept as low as possible.

Recommendations for Forward Error Correction

The RTP protocol, IEFT (Internet Engineering Task Force) de facto standard for VoIP, has two recommendations on implementing Forward Error Correction to compensate for packet loss. These two recommendations are discussed in this section.

Regarding the first recommendation, the RFC 2198 (Request For Comments) proposes a Forward Error Correction scheme where all data is basically transmitted twice. Hence, the algorithm does not include any error control coding.

Regarding the second recommendation, the RFC 2733 proposes a Forward Error Correction algorithm that is a generic solution on how to add redundant information in the form of error correction to protect for packet loss.

New Solution Using Interleaving

The following discussion involves the design of the alternative Forward Error Correction solution. In the previous section, an existing solution for FEC in a VoIP gateway is described and the its major drawbacks are concluded. The reason behind these drawbacks stems mostly from the fact that the error correction capabilities are very high. Consequently, the computational requirements are extremely high. The packet loss that normally needs to be compensated for is likely to be lower than what the existing method is designed for. The average packet loss over the Internet is mostly in the region 5–8%. It has also been shown that the vast majority of losses are of single packets. Burst losses of two or more packets are less frequent than single packet loss, although they do appear more frequent than would be expected in a purely random process.

The errors that need to be corrected for are still going to be the loss of an IP datagram over the network. This will result in the loss of a complete voice frame that has to be restored in order to fully correct the error.

Instead of generating ECC for each frame separately, several voice frames are grouped together and ECC is generated using the data from all frames. This increases the code rate R compared with the previous solution. A higher code rate will mean a lower complexity for generating ECC and decoding the codewords. In turn, this also decreases the amount of bandwidth required. The frame-packing algorithm used by VTP is a major reason this can be done effectively, since frames from multiple calls can be gathered. However, the embodiment is not limited to a FEC scheme where Frame Packing is used.

When transmitting, the data and the ECC are first interleaved together so that the data from each frame is spread out over all frames in the group that are transmitted. This makes the method capable of handling different frame sizes. The frames are all sent in different VTP packets in order to not loose more than one frame from each interleaved group when losing a VTP packet. If one packet is lost the frames in the packet can be restored from the data and the ECC that did arrive. This is achieved by using the Reed-Solomon algorithm.

The method is first examined under the ideal condition where all voice frames are of the same size. Five VTP frames are supplied from the voice hardware, 25 bytes each, a total of 125 bytes. All frames are from different calls, which insure that there is no significant latency involved in waiting for all five packets to arrive.

Figures 10, 11:
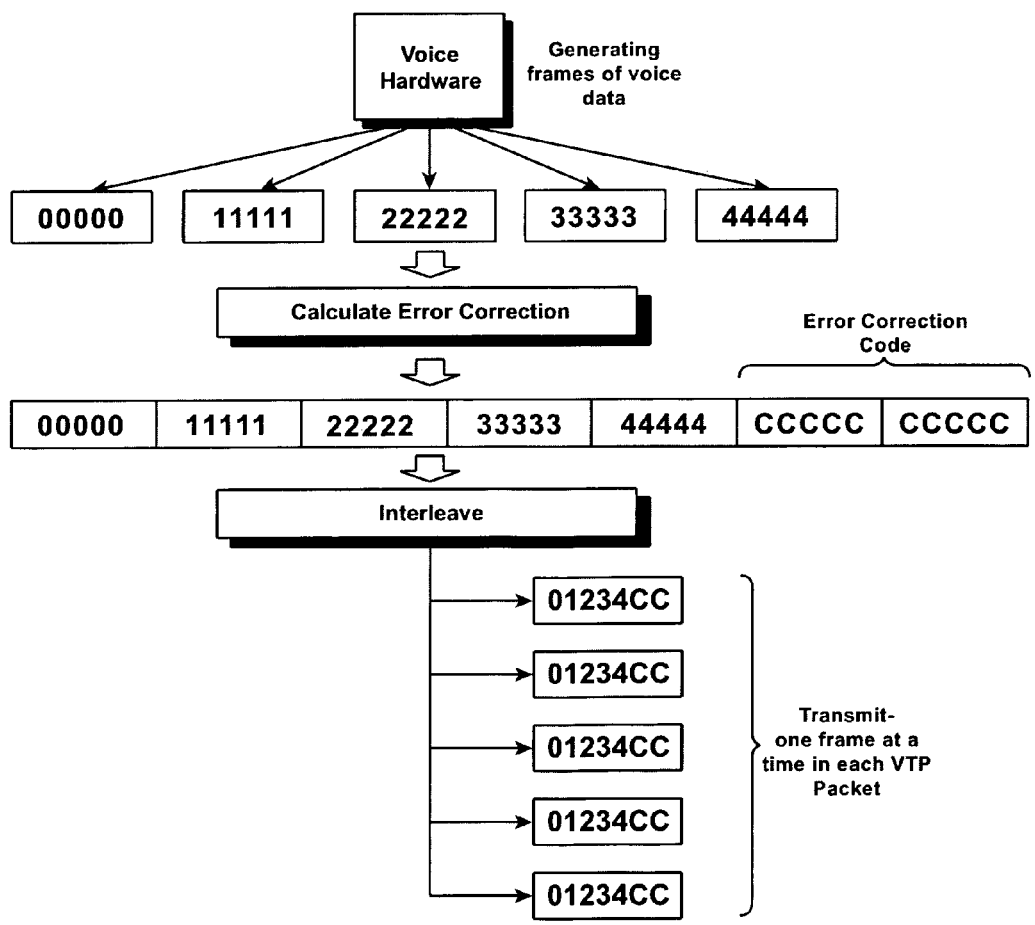
FIG. 10 shows voice frames, in accordance with an embodiment of the present invention.
FIG. 11 illustrates a process for calculating error correction and interleaving frames, in accordance with one embodiment of the present invention.

FIG. 10 shows voice frames, in accordance with an embodiment of the present invention. Keep in mind that the VoIP gateway is sending multiple simultaneous calls between to the destination gateways.

Error Correction Code is generated per the Reed-Solomon algorithm using a (175, 125) R-S code. A shortened R-S code using GF(256) would be flexible enough for this purpose.

FIG. 11 illustrates a process for calculating error correction and interleaving frames, in accordance with one embodiment of the present invention. Before transmitting, the frames are interleaved to prevent from loosing the data from an entire voice frame. In the case of loss an entire frame will not be lost. This will also give a more spread out error pattern that R-S can correct better. And most important it will provide the opportunity to handle different frame sizes within the five packets in the group. Different frame sizes will occur when different compressions are used on the five calls. Interleaving the frames will create five frames that are equal in size. All five frames generated here will be encapsulated in a different VTP packet. This will avoid loss of more than one of the new VTP frames in the group of five frames in the same lost VTP packet.

At the receiving end, the frames are deinterleaved as they arrive. The deinterleaver places the data in one of the five new frames. The information needed in order to calculate where in the frames to place the data is, first the number of frames that were interleaved. Second, their original size and third, a sequence number for the frame's position within the group of frames that where interleaved together.

The restored frames will be kept in a buffer until a certain delay time expires or all frames in the interleaved group have arrived.

Figure 12:
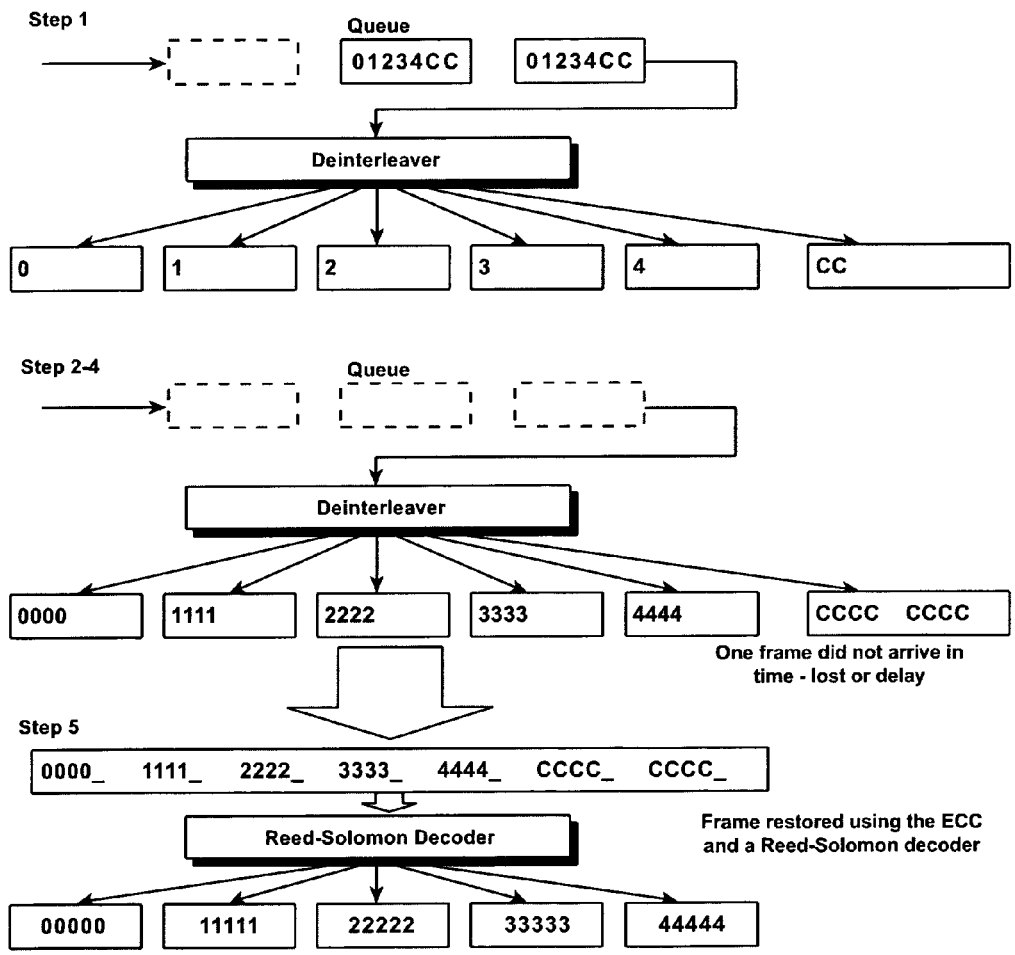
FIG. 12 shows a receiver deinterleaving and decoding arriving frames, in accordance with an embodiment of the present invention.

FIG. 12 shows a receiver deinterleaving and decoding arriving frames, in accordance with an embodiment of the present invention. Here are some possible scenarios at the receiving end:
  All five packets arrive within a permitted delay—no error correction needed. Frames are deinterleaved and passed on to the Voice Hardware.
  One packet is lost or delayed more than permitted, 7*5=35 bytes lost.
  Two or more packets are lost or delayed. If two packets are lost 7*10=70 bytes are lost. This is not correctable with the amount of ECC generated. As explained below, no more than 50 bytes are correctable. However, this embodiment is flexible, and future implementations of this embodiment may not be so limited by this technical limitation.

The amount of generated ECC is therefore non-optimal since we generate 50 bytes but never uses more than 35 to correct for lost packets. An optimal ratio between data and redundant information (ECC) can be found by studying what error correction capability that is needed (the loss rate supported) and the size of the frames supplied from the voice hardware. Several cases can be chosen from depending on the desired loss-rate. The higher the amount of ECC, the more complex will the computations of the Reed-Solomon code be. Another consequence to keep in mind is that the more packets that are interleaved together the more VTP packets will have to be created in order to keep frames from the same group of interleaved frames separate. Evidently this will result in a slightly higher bandwidth.

In the simplified description of the algorithm some concerns can be raised regarding the following issues:
  Backwards compatibility—A VoIP gateway with FEC needs to be able to communicate with any older version of the same VoIP gateway that does not use FEC. It could also be necessary for a VoIP gateway to interoperate with a VoIP gateway from another vendor. This would best be solved in a way where negotiation about whether to use FEC is done over a control channel. This issue is easier to handle in the existing solution where deinterleaving were not used. In that case a receiving node without FEC capability could discard frames containing ECC (Error Correction Codes). The fact that the size of the frames supplied by the voice hardware spans from 1 byte to 240 bytes makes it impossible to generate ECC for multiple frames without first interleaving them or using padding.
  Different frame sizes—In order to use interleaving, the size of the original frames has to be known at the receiving end. Otherwise, the deinterleaver will not be able to restore the initial frames. One solution to this is to pad all the packets up to same size as the largest packets, as described above. This would consume extra bandwidth since the size of the packets is varying greatly. Padding would also force the use of longer and, hence, more complex Reed-Solomon codewords. Another solution is to communicate the size of the original packets in the header for the interleaved data. This will naturally mean some extra overhead, but not as much as the solution above, and is here considered to be the best solution.

The following discussion addresses the issue with different frame sizes mentioned in the section above. In the description below the number of frames interleaved together is set to five, but this number is just an example and can be chosen freely depending on the needs for the system.

The frames in a VoIP gateway using VTP, for example, may vary in size from 8 bytes up to 247 bytes, depending on the compression scheme that is used on the call.

Each call that is setup can use a separate compression. The frame size is also different depending on what kind of service that is used, phone, fax or modem. Some compression schemes also use silent compression that will result in smaller frames. Since the difference in size is great, the method of padding all the frames up to the same size is not regarded as effectively feasible.

Instead, it is tried to spread each frame out as equally as possible over the five new frames, by taking byte after byte from the original frame and sequentially place them in new frame 1 trough 5. An analogy that can be chosen to describe this is like handing out a deck of cards until one runs out of cards. If the number of bytes is divisible by 5 it will be equally spread out over the new frames. Otherwise, original frame 1 will just end spreading out bytes and original frame nr 2 will just start to put bytes where original frame nr 1 stopped to put bytes.

This solution will not only give the advantage of a spread out error pattern and prevent us from losing a whole frame but it will also be a way of coping with the large differences in frame sizes. The end result of the interleaving will be five new frames all of them almost equal in size, differing in size by mostly 1 byte.

Before starting the interleaving process, the ECC is generated by the Reed-Solomon algorithm to be able to reconstruct the original frames. When all the original frames are interleaved into the new frames the generated ECC will also be interleaved in the new frames.

The data in the interleaved frames data now contains parts of original header, data and ECC from all the frames in the group of interleaved frames. In front of this data there has to be a header appended to describe the contents of the frame.

Copying the existing header of the original frame to the new frame is possible. We have to keep in mind though that the data length field will not be the same since there will be the ECC bytes appended at the end of each new frame. Instead of using one byte to indicate the data length in the frame two bytes have to be used.

Except for the header that is copied from the original frame there has to be extra information added about the interleaved frames into the headers. This includes first the size of every original frame and second a Group ID that specifies which group of interleaved frames that a frame belongs to. The third thing needed in the extra header is a Group Sequence Number specifying where in the group the frame belongs.

All of the new fields described above will take up no more than 1 byte since the numbers they will be used to describe all will be in the range 0–255. Note that when the capacity of the VoIP gateway increases, the new fields might end up taking up more than 1 byte.

FIG. 13 shows the format of the extra header for reconstructing and interleaving frames, in accordance with an embodiment of the present invention. Without that information it would not be possible to reconstruct/deinterleave the frames. This extra header will be placed after the VTP frame header and will be of variable size depending on the number of frames that are interleaved. The extra header does not have to contain any information about which R-S code that is used since this can be decided at the receiving end in the same manner as it was decided at the transmitting end. The amount of ECC bytes is derived from the number of frames in each group, the number of frames we can lose in this group and of course how many bytes we are generating ECC for.

FIG. 14 is a voice transport protocol extension (VTPX) frame header format, in accordance with an embodiment of the present invention. VTPX is the name of the new frame format constructed when changing the data length field and appending the extra header.

The frame-packing algorithm that is currently used in a VTP-based VoIP gateway, described above in the "Voice Over IP Protocols" section, has to be modified in order to support the Forward Error Correction (FEC) algorithm. The change is mentioned briefly in the initial description of the design. If the embodiment is used with a protocol not using frame packing, which is possible, the procedures below do not necessarily have to be followed.

The way frame packing works in VTP, the frames are unconditionally packed into a larger VTP packet. The constraint brought in by the FEC algorithm is that a VTP packet is not allowed to contain more than one frame from each group of interleaved frames. A potential drawback for this is that we might end up generating a larger number of VTP packets than without Forward Error Correction.

Figure 15:
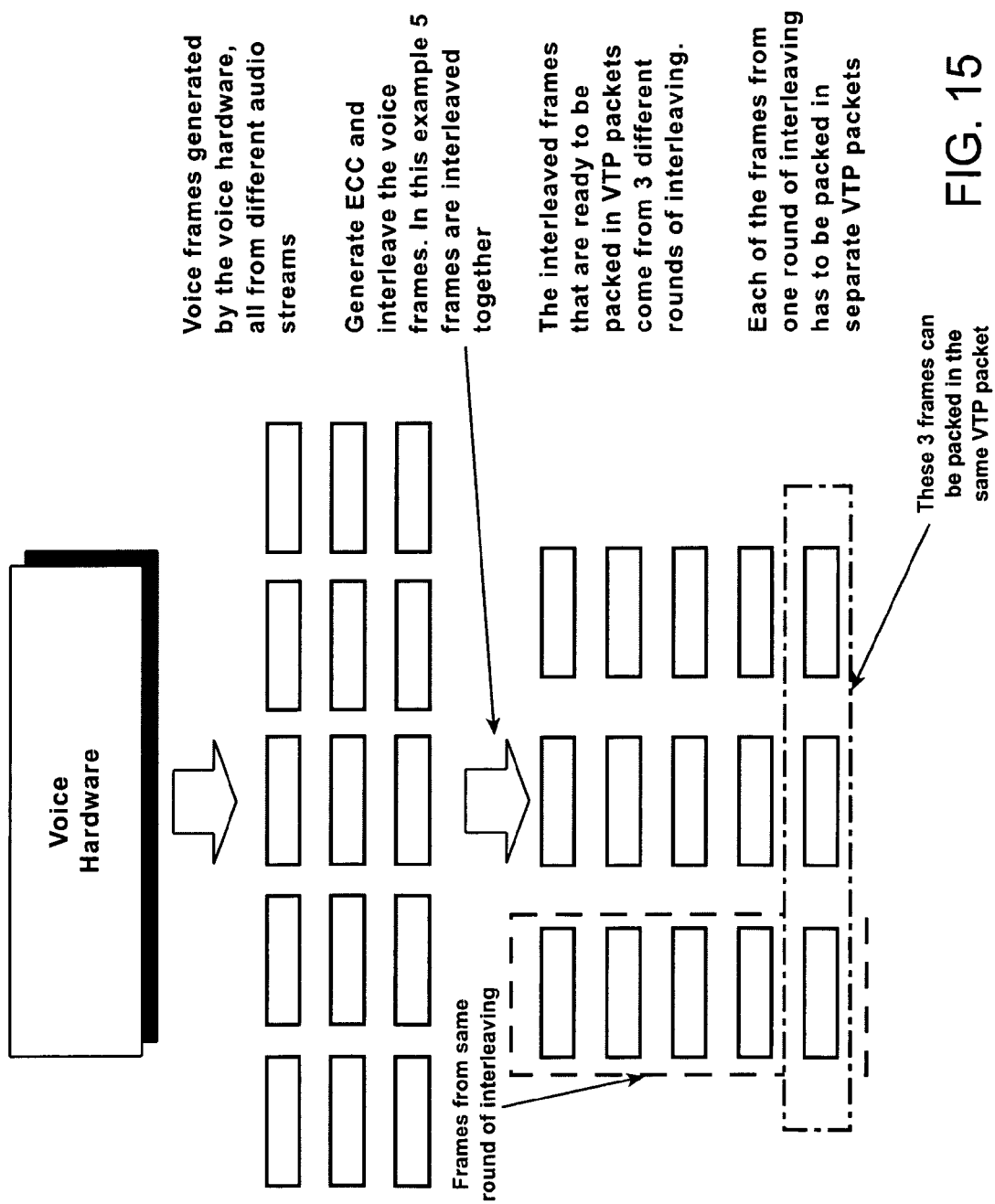
FIG. 15 shows the scheme for frame packing when Forward error correction is used, in accordance with an embodiment of the present invention.

FIG. 15 shows the scheme for frame packing when Forward error correction is used, in accordance with an embodiment of the present invention. To better understand the steps presented in this theory, another straightforward example is provided below.

Before starting the interleaving process, all the five frames that are about to participate in an interleaved group have to arrive. This is because the ECC have to be generated before the interleaving process starts.

FIG. 16 shows the five initial frames, in accordance with an embodiment of the present invention. However, the embodiment is not limited to 5 frames, and can include any number of frames.

From the data length fields in the headers the total amount of data not including headers can be calculated to 1+18+14+10+24=67 bytes. Including the headers this adds up to 102 bytes we have to generate ECC for. Using the formula for generating optimal ECC with the constraint that we can lose 1 out of 5 frame, 26 bytes of ECC has to be generated. See formulas in the ECC Ratio section below. The Reed-Solomon code that has to be used is thus of the format (128, 102), which is a shortened Reed-Solomon code.

FIG. 17 shows generated ECC data, in accordance with an embodiment of the present invention. The extra header that has to be added will in this case be 7 bytes since there will be 5 fields for the sizes of the 5 original frames.

FIG. 18 shows extra header data, in accordance with an embodiment of the present invention. The header of each frame is copied over to the new frames together with the newly created extra header.

Figure 19:
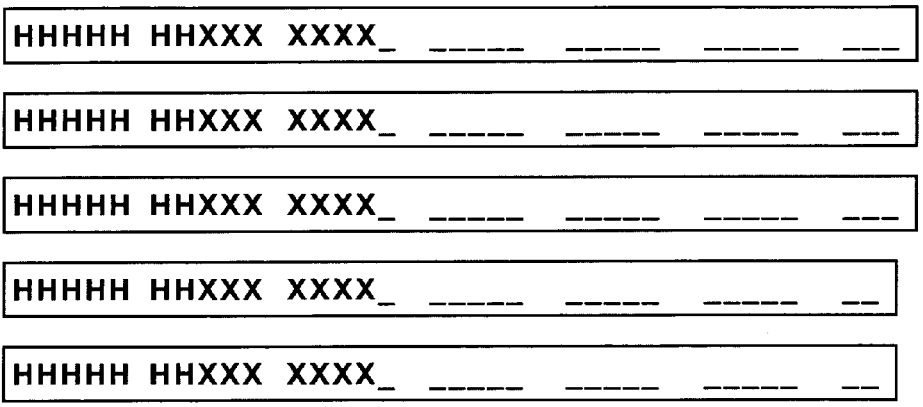
FIG. 19 shows the new VTPX frames before interleaving of data and ECC, in accordance with an embodiment of the present invention.

FIG. 19 shows the new VTPX frames before interleaving of data and ECC, in accordance with an embodiment of the present invention. The 3 first frames will be constructed to contain 19 bytes of interleaved data and ECC. The 2 last will contain 18 bytes. This adds up to 33 and 32 bytes as the total size per frame. At this point the data length field in the header is changed to match these new conditions.

Figure 20:
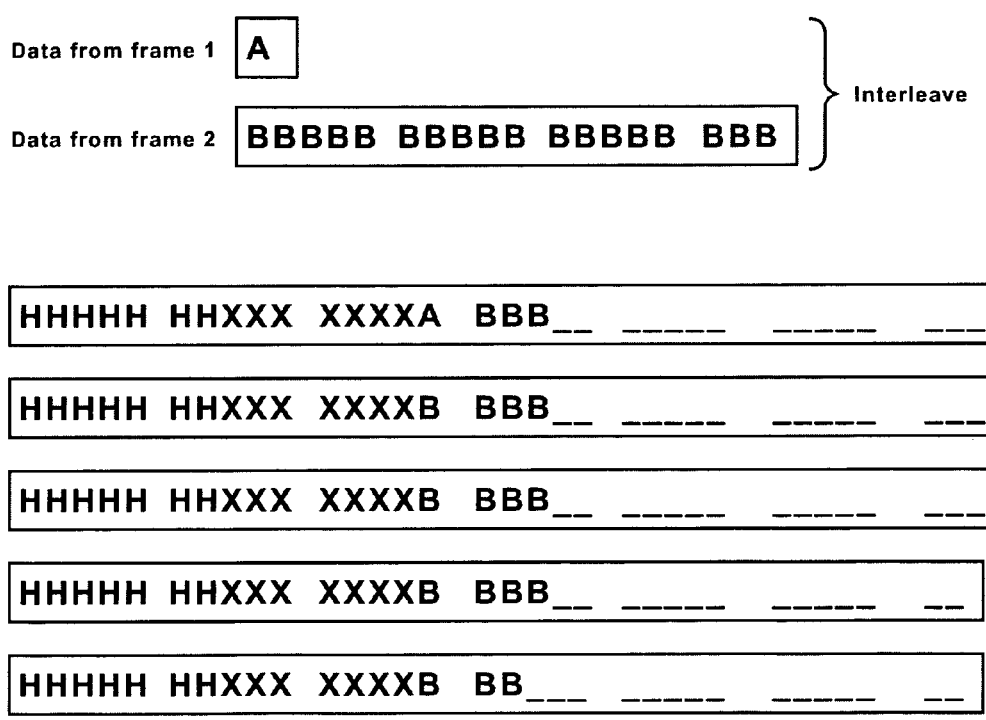
FIG. 20 shows interleaving data from frame number 1 and frame number 2 into the new frames, in accordance with an embodiment of the present invention.

FIG. 20 shows interleaving data from frame number 1 and frame number 2 into the new frames, in accordance with an embodiment of the present invention.

Figure 21:
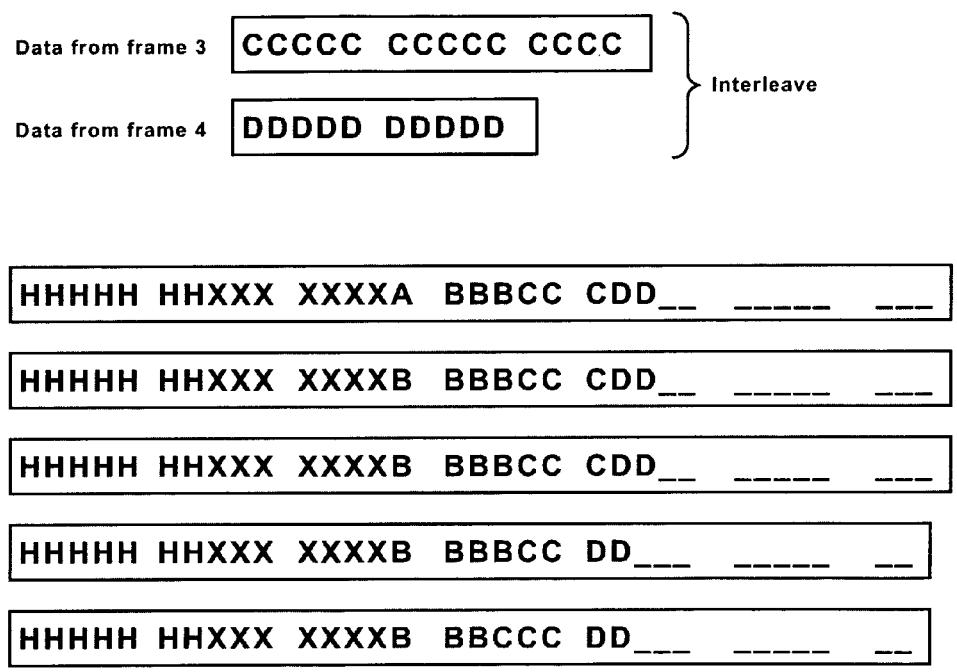
FIG. 21 shows interleaving data from frame number 3 and frame number 4 followed directly after that, in accordance with an embodiment of the present invention.

FIG. 21 shows interleaving data from frame number 3 and frame number 4 followed directly after that, in accordance with an embodiment of the present invention.

Figure 22:
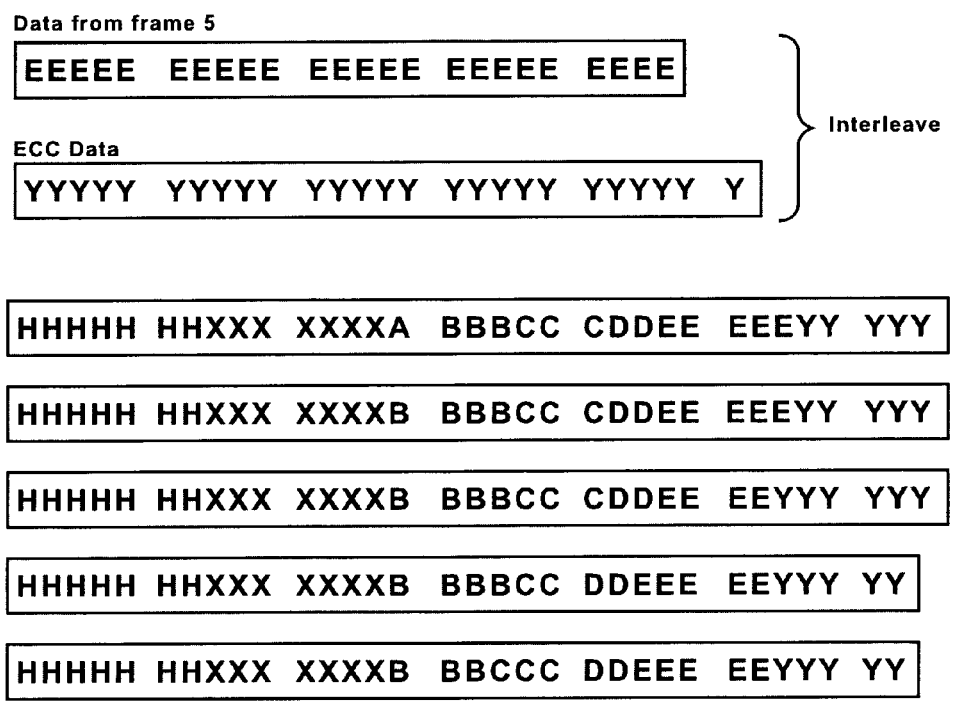
FIG. 22 shows interleaving data from frame number 5 and ECC data, in accordance with an embodiment of the present invention.

FIG. 22 shows interleaving data from frame number 5 and ECC data, in accordance with an embodiment of the present invention. The generation of ECC generates 26 bytes of data that is interleaved into the frames is shown in FIG. 22. The frames in FIG. 22 are the frames that will be put in the VTP packets and sent over the network. The overhead caused by the Forward Error Correction is therefore 61 bytes on 102 bytes of data and header (5*7=35 byte for the extra header and 26 bytes for ECC). Thus 60% of overhead results, but this example contains only small frames, which result in a large overhead than in actual use.

The deinterleaving is done continuously at the receiving end based on information from the header about sequence number and the extra header about original frame sizes. In this example an IP datagram containing frame number 1 is lost or delayed over the network.

FIG. 23 describes the frames when the deinterleaving is done, in accordance with an embodiment of the present invention. A missing byte is noted x. The total number of data bytes that are lost is 21 and the number of ECC bytes that where lost is 5 which comes to a total of 26 lost bytes. Since the transmitter side generated 26 bytes of ECC and we also know the locations of the error these lost bytes are recoverable using the Reed-Solomon algorithm.

When grouping as much as five voice frames together and generating ECC for them we can have a maximum of 5 times 247 bytes to generate ECC for.

As described in the theory section on Reed-Solomon, the algorithm is based on the theory of Galois Fields. The Galois fields are labeled $GF(2^m)$, thus $GF(2)$, $GF(4)$, $GF(8)$. . . . $GF(256)$, $GF(512)$, $GF(1024)$ and so forth. When using the Reed-Solomon code this results that we in each codeword have $2^m$ positions that should contain both data and ECC bytes. The relationship between data and ECC in the Galois Field is described in the ECC Ratio section below.

In order to hold all the data and ECC when all the packets reach maximum size we would be forced to use GF (2048). The drawback of large Galois Fields are that the computation and complexity becomes much higher than for smaller Galois Fields.

The symbol size varies for all the different Galois Fields and equals (m+1) bits. In GF (2048) this indicates a symbol size of 11 bits since $2048=2^{11}$. Since the symbols sizes vary with each Galois Field, the arithmetic operations will also vary. Using the same Galois Field will spare the effort of implementing the operations for more than one Galois field.

If GF (2048) were chosen, it is then preferable to use that Galois Field when generating ECC for the minimum case when the five interleaved frames contain 8 bytes each. This would become a more complex operation than using a smaller Galois Field to generate ECC.

A better alternative over using the GF(2048) would be to split up the data over multiple Galois Fields of the same size. The most efficient Galois Field to use would most likely be GF (256) since its symbol size equals a byte (8 bits). This means that instead of using one codeword for each group of interleaved frames we use several shorter codewords that all use the same Galois Field structure.

When all five frames that should be interleaved together have arrived the number of codewords that has to be used can be decided. This decision is based on the total length of the data and how much data that can be fit in to each codeword. The latter is decided from how much ECC that has to be generated.

This approach will be scalable to use for other combinations of interleave size (number of frames interleaved together) and recoverable frame loss. Which means losing 2 out of 7, 1 out of 8 or any other desirable combination. Regardless of how many codewords that is needed, all the basic structures and functions for GF(256) is already in place.

One thing is changed though by splitting the data over multiple codewords. The structure and distribution of the lost bytes becomes such that when for example losing 1 frame out of 5, more than a fifth of the bytes in one codeword may be lost. This comes from the fact that a codeword potentially could contain the full header from the lost frame and then losing a fifth of all its data and ECC bytes. This comes down to a higher total loss rate than one fifth. The number of data bytes that goes in each codeword therefore has to be equally distributed over the codewords.

Since we then have to generate more ECC than when not using multiple codewords, we end up with a slightly larger overhead arising from the Forward Error Correction. The procedure of deciding exactly how much ECC to generate is described in the ECC Ratio section below.

Using the formulas developed in the ECC Ratio section below and a short test program, the following statistics could be extracted on average overhead and recoverable loss rate. See Table 2 below. A short description of all variables follows as well as comments on the obtained values.

TABLE 2

Overhead and Loss Rate

| Interleave Size | Recoverable Frames | Average Overhead | Recoverable Loss Rate | ECC GENERATOR | Data Symbols in GF256 | ECC Symbols in GF256 |
|---|---|---|---|---|---|---|
| 3 | 1 | 79.5% | 33.3% | 1.70483 | 160 | 95 |
| 4 | 1 | 59.8% | 25% | 2.43702 | 180 | 75 |
| 5 | 1 | 49.7% | 20% | 3.10349 | 192 | 63 |
| 6 | 1 | 43.5% | 16.7% | 3.71272 | 200 | 55 |
| 7 | 1 | 39.1% | 14.3% | 4.27178 | 206 | 49 |
| 8 | 1 | 35.9% | 12.5% | 4.78662 | 210 | 45 |
| 9 | 1 | 33.6% | 11.1% | 5.26228 | 214 | 41 |
| 10 | 1 | 31.8% | 10% | 5.70308 | 216 | 39 |
| 5 | 2 | 104.6% | 40% | 1.14868 | 163 | 92 |
| 6 | 2 | 84.8% | 33.3% | 1.46272 | 174 | 81 |
| 7 | 2 | 72.9% | 28.6% | 1.74978 | 182 | 73 |
| 8 | 2 | 64.9% | 25% | 2.01321 | 189 | 66 |
| 9 | 2 | 59.0% | 22.2% | 2.2558 | 194 | 61 |
| 10 | 2 | 54.6% | 20% | 2.47993 | 198 | 57 |
| 7 | 3 | 124.9% | 42.9% | 0.91599 | 163 | 92 |
| 8 | 3 | 106.5% | 37.5% | 1.09567 | 171 | 84 |
| 9 | 3 | 94.0% | 33.3% | 1.26055 | 177 | 78 |
| 10 | 3 | 85.1% | 30% | 1.41239 | 183 | 72 |

Interleave size is the number of frames that are interleaved together.

Recoverable Frames is the number of frames that can be lost and recovered in each group of interleaved frames.

Average Overhead is the percentage of the increased number of bytes that has to be sent over the network caused by the Forward Error Correction. This number is based on an assumption that the possible sizes of all frame formats (here: 7, 49, 25, 9, 21, 31, 11, 17 and 247 bytes) all appear with equal probability. This is naturally not the case in the real application but has to do as an assumption for now. If the larger frame sizes are used more frequently the Average Overhead will come down a bit and in the same way it will raise if the smaller frame sizes are used more frequently. The values are valuable to compare against each other.

Recoverable Loss Rate is not actual overall loss rate since it is just based on the loss in each group of interleaved frames and not the loss rate of IP datagram over the network. The loss of frames has to be equally distributed over the groups of interleaved frames for this number to be fully accurate.

ECC GENERATOR is the number is used in order to decide how much ECC that has to be generated given the number of bytes in each interleave group. Used in the Reed-Solomon class in the source code of the implementation. What the number actually describes is the relationship between data bytes and ECC.

Data/ECC symbols in GF256: Given the value of ECC_GENERATOR we know how many positions of the Galois Field that can contain data and ECC respectively. Note that these numbers are the maximum. It is most often a lower value.

Losing more than one frame out of an interleaved group becomes ineffective due to the fact that the headers of the lost frames can appear in the same Galois Field and therefore extra ECC has to be generated to cover that special case.

Implementation

Implementing the algorithm in software is a good way of judging its performance and evaluating the solution. For a commercially applicable solution an implementation in hardware using FPGA or a dedicated ASIC would most likely be the best choice.

The documentation of the implementation is divided in to three sections. First, the implementation of the encoder and decoder of the Reed-Solomon codewords are described. In the second section, the method of implementing the interleaving of VTP frames are laid out. Last, the necessary modifications of the VoIP gateway's frame packing are described.

Reed-Solomon Layer

This layer holds the core functions of the error correction. The two main functions in this layer are first, generating Error Correction Code and second, decoding and restoring data for a codeword with erasures.

The major part of the difficulties in implementing error correcting codes comes from the fact that the arithmetic used in error correcting code is different from the arithmetic that one is normally familiar with. This arithmetic includes Finite Fields as described in the theory section for Reed-Solomon. An excellent reference to C++ implementation of Reed-Solomon codes can be found in Rorabaugh, B.: "Error Coding Cookbook: practical C/C++ routines and recipes for error detection and correction," New York: McGraw-Hill, 1995. ISBN 0-07-911720-1.

Interleaving Layer

The Interleaving layer is the step above the Reed-Solomon Layer in the implementation. Its basic function is to group the frames accordingly and send them down to the Reed-Solomon layer that generates ECC. Finally this layer interleaves the frames and passes them onto the frame packing that takes care of transmitting packets. On the receiving side the reverse operation is made and decisions are taken here on when to restore frames using functions in Reed-Solomon Layer.

Frame Packing Layer

Except from packing the frames, this layer also checks whether FEC should be used. The use of FEC should be set on a per node basis in the configuration. When transmitting a frame, it is first checked whether the user has configured for FEC and then if the node on the receiver side actually can handle FEC. In that case a frame from the voice hardware is passed on to the Interleaving layer instead of taking the normal steps in the frame packing.

When receiving a frame of the IP network, the extracted frames are passed on to Interleaving Layer in case FEC is used.

ECC Ratio

Two different scenarios for calculating the ratio of ECC and data in a Reed-Solomon codeword are presented below.

Generate ECC Using Single Codewords

The Reed-Solomon code is normally described with (n,k)
n=Number of symbols in the codeword, including data and redundant information ECC
k=Number of data symbols
n−k=Number of ECC symbols When symbols in a codeword is lost and the location of the erasure is known, we can correct by the most as many symbols as there were ECC symbols. This is described in relation (1).

$$\text{\# of recoverable symbols} \leq \text{\# of ECC symbols} \quad (1)$$

To simplify let:
y=k
x=n−k

Our scenario of loosing data is that one or more frames out of a group of frames are lost.
B=Total number of frames interleaved together
A=Number of recoverable frames Modifying (1) to accommodate the above gives us the constraint (2):

$$\text{\# of symbols in lost frame(s)} \leq \text{Total \# of ECC symbols} \quad (2)$$

Inserting the variables above into (2) gives (3):

$$n - k = (y + x) - \frac{A(x + y)}{B} = y \quad (3)$$

Writing x as a function of A, B and y gives (4):

$$x = \frac{A}{(B - A)} \times y \quad (4)$$

The formula in (4) now gives us how many ECC symbols we need to generate based on first, the number of frames in a group interleaved together, second, the number of frames lost from a group and last, the number of data symbols in the group.

Generate ECC Using Multiple Codewords

The formulas derived in previous section become invalid when we need to use multiple codewords. When using a single codeword, losing for example one VTPX frame out of five, always means that the number of erasures in the codeword is ⅕ of all the symbols in the codeword.

First thing to note when using multiple codewords to protect data is that the data that should be protected has to be equally distributed over the codewords that are used. For example, if it is concluded that three codewords need to be used the number of data symbols in these three codewords should not differ by more than a byte.

When using multiple codewords the loss ratio can change since losing one VTPX frame means losing the header from one of the VTP frames but one fifth of the data and ECC from every VTP frame. The headers are not interleaved and we can therefore experience the loss of 7 straight symbols in addition to losing every fifth symbol out of the interleaved data and ECC. This raises the ratio of lost bytes in the codeword.

First formula to state is the way we use to calculate the ratio G between data and ECC (5).

$$G = \frac{Data}{ECC} \quad (5)$$

The use of this formula is normally that the number of data symbols is known along with the ratio G and the number of ECC symbols that should be generated has to be decided. The goal of these calculations is to decide a value for G in every combination of the number of frames that are interleaved together and how many of the frames in the group that can be lost and recovered. The constraint that needs to be fulfilled is (6), which is derived from (1).

ECC symbols in codeword ≧ lost symbols in codeword (6)

With (6) as a starting point a formula for both sides has to be stated.

Worst-case scenario occurs when the impact of losing the only header in a codeword is as greatest. This is naturally when the codeword is as short as possible but still allowing the scenario of having one header in a codeword. The shortest codewords occurs when the data and ECC is just one byte too long to all fit in one codeword. Two codewords have to be used.

Maximum number of data symbols M in a GF(255) codeword can be derived from (7) which states that the maximum number of data symbols added to the maximum number of ECC symbols equals 255. M as a function of G is then given in (8).

$$M = 255 - \frac{M}{G} \quad (7)$$

$$M = \frac{255 * G}{1 + G} \quad (8)$$

A split over to codewords is needed as soon as we have M+1 data symbols. This is the scenario that has to be accounted for.

When loosing frames over the network the lost symbols can be divided into three categories, data, ECC and header. The lost data in a codeword is described in (9).

$$LostData(G) = \left(\frac{(M+1)}{2} - 7x\right) * \frac{x}{N} = \left(\frac{\left(\frac{255*G}{G+1} + 1\right)}{2} - 7x\right) * \frac{x}{N} \quad (9)$$

x = Number of lost frames

N = Number of Frames Interleaved together

As stated above the total number of Data symbols in the codeword is M+1 divided over two codewords. A minimum of these 7 symbols can come from a header. If we for example have lost 1 of 5 frames, every fifth of these data bytes are lost.

Lost ECC symbols are hence calculated in the same manner as above in (10).

$$LostECC(G) = \left(\frac{(M+1)}{2*G}\right) * \frac{x}{N} = \left(\frac{\left(\frac{255*G}{G+1} + 1\right)}{2*G}\right) * \frac{x}{N} \quad (10)$$

Symbols in a codeword lost from a lost header simply equal 7 times the number of lost frames. Putting this together with (9) and (10) gives us the complete formula for lost symbols as a function of G, x and N in (11).

$$Lost(G) = \left(\frac{\left(\frac{255*G}{G+1} + 1\right)}{2} - 7x\right) * \frac{x}{N} + \left(\frac{\left(\frac{255*G}{G+1} + 1\right)}{2*G}\right) * \frac{x}{N} + 7x \quad (11)$$

The right side of (6) is now determined, left side is given by (12).

$$ECC(G) = \left(\frac{\left(\frac{255*G}{G+1} + 1\right)}{2*G}\right) \quad (12)$$

Given a value for x and N, G can now be determined from (13) which is derived from (6).

$$ECC(G) \geq Lost(G) \quad (13)$$

$$\left(\frac{\left(\frac{255*G}{G+1} + 1\right)}{2*G}\right) \geq$$

$$\left(\frac{\left(\frac{255*G}{G+1} + 1\right)}{2} - 7x\right) * \frac{x}{N} + \left(\frac{\left(\frac{255*G}{G+1} + 1\right)}{2*G}\right) * \frac{x}{N} + 7x$$

This inequality was solved graphically for the desired combinations of x and N. Results are displayed in Table 2 above.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, adding redundant information to packets to be transmitted, transmitting the packets, and restoring one or more lost packets using redundant information of arrived packets, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of forward error correction for packets of information transmitted in a network, the method comprising:
   adding redundant information to the packets to be transmitted, by interleaving the redundant information with data from a group of frames included in the packets into an interleaved group of frames, such that data from each frame in the group of frames and the redundant information are spread out over all frames in the interleaved group of frames;
   transmitting the packets, wherein the packets include the interleaved group of frames, wherein many of the packets become arrived packets, and wherein one or more of the packets becomes one or more lost packets; and
   restoring the one or more lost packets using redundant information of the arrived packets.

2. The method of claim 1, wherein the forward error correction is configured to be used in a voice over internet protocol (VoIP) network.

3. The method of claim 1, wherein the step of restoring the one or more lost packets comprises generating the one or more lost packets using Reed-Solomon Codes and the redundant information of the arrived packets.

4. The method of claim 1, wherein the redundant information of the transmitted and arrived packets is error correction code (ECC).

5. The method of claim 4, wherein the step of adding redundant information comprises adding error correction code (ECC) to the group of frames.

6. The method of claim 5, wherein an error correction code rate (R) is greater than ½, and wherein the error correction code rate is associated with reduced complexity for generating error correction code and for decoding code words.

7. The method of claim 1, wherein the step of transmitting the packets comprises:
   transmitting each frame in different packets; and
   losing not more than one frame per each interleaved group of frames.

8. The method of claim 1, wherein the step of transmitting the packets comprises:
   transmitting each frame in different packets; and
   losing at least two frames per each interleaved group of frames;
   wherein the step of restoring the one or more lost packets comprises correcting for the at least two frames.

9. A method of transmitting packets of data in a network, wherein each packet includes a group of frames of data, the method comprising:
   adding error correction code (ECC) to the packets of data to be transmitted;
   interleaving the error correction code with data in the group of frames of data to form an interleaved group of frames, such that data from each frame in the group of frames and the error correction code (ECC) are spread out over all frames in the interleaved group of frames; and
   transmitting the packets.

10. A method of receiving packets of data from transmitted packets of data in a network, wherein each packet includes frames of data, the method comprising:
    receiving packets, wherein the packets include an interleaved group of frames of data, wherein data from each frame in a group of frames of data and error correction code (ECC) are spread out over all frames in the interleaved group of frames, and wherein each frame in the interleaved group of frames contains interleaved data and interleaved error correction code (ECC);
    deinterleaving the groups of frames to form deinterleaved frames;
    extracting the error correction code from the deinterleaved frames; and
    restoring one or more lost packets using the error correction code.

11. The method of claim 10, wherein the step of restoring one of more lost packets comprises generating the one or more lost packets using Reed-Solomon Codes and the error correction code (ECC).

12. A computer-readable medium carrying one or more sequences of one or more instructions for forward error correction for packets of information transmitted in a network, the one or more sequences of one or more instructions including instructions which, when executed by one or more processors, cause the one or more processors to perform steps of:
    adding redundant information to the packets to be transmitted, by interleaving the redundant information with data from a group of frames included in the packets into an interleaved group of frames, such that data from each frame in the group of frames and the redundant information are spread out over all frames in the interleaved group of frames;
    transmitting the packets, wherein the packets include the interleaved group of frames, wherein many of the packets become arrived packets, and wherein one or more of the packets becomes one or more lost packets;
    restoring the one or more lost packets using redundant information of the arrived packets.

13. The computer-readable medium of claim 12, wherein the forward error correction is configured to be used with voice over internet protocol.

14. The computer-readable medium of claim 12, wherein the step of restoring the one or more lost packets further causes the processor to carry out the step of generating the one or more lost packets using Reed-Solomon Codes and the redundant information of the arrived packets.

15. The computer-readable medium of claim 12, wherein the redundant information of the transmitted and arrived packets is error correction code (ECC).

16. The computer-readable medium of claim 15, wherein the step of adding redundant information further causes the processor to carry out the step of adding error correction code (ECC) to the group of frames.

17. The computer-readable medium of claim 16, wherein an error correction code rate (R) is greater than ½, and wherein the error correction code rate is associated with reduced complexity for generating error correction code and for decoding code words.

18. The computer-readable medium of claim 12, wherein the step of transmitting the packets further causes the processor to carry out the steps of:
   transmitting each frame in different packets; and
   losing not more than one frame per each interleaved group of frames.

19. The computer-readable medium of claim 12, wherein the step of transmitting the packets further causes the processor to carry out the steps of:
   transmitting each frame in different packets; and
   losing at least two frames per each interleaved group of frames;
   wherein the step of restoring the one or more lost packets further causes the processor to carry out the step of correcting for the at least two frames.

* * * * *